United States Patent [19]

Ure et al.

[11] 4,426,996
[45] Jan. 24, 1984

[54] SOLAR COLLECTOR APPARATUS

[75] Inventors: Dennis J. Ure; Arthur H. Wilder; Richmond W. Wilson, all of Corning, N.Y.

[73] Assignee: Corning Glass Works, Corning, N.Y.

[21] Appl. No.: 280,891

[22] Filed: Jul. 6, 1981

[51] Int. Cl.$^3$ .............................................. F24J 3/02
[52] U.S. Cl. .................... 126/443; 126/448; 126/450
[58] Field of Search ............... 126/443, 447, 448, 450; 211/41; 267/160; 428/212, 426; 285/347

[56] References Cited

U.S. PATENT DOCUMENTS

| | | | |
|---|---|---|---|
| 2,477,533 | 10/1946 | Whiting | 285/347 |
| 3,227,153 | 1/1966 | Godel et al. | 126/443 |
| 3,673,049 | 6/1972 | Giffen et al. | 161/164 |
| 3,952,724 | 6/1974 | Pei | 126/443 |
| 4,043,318 | 1/1976 | Pei | 126/443 |
| 4,069,811 | 1/1978 | Tabor | 126/443 |
| 4,183,351 | 1/1980 | Hinotani et al. | 126/443 |
| 4,205,655 | 6/1980 | Hunt | 126/443 |
| 4,273,104 | 6/1981 | Vroshevich | 126/443 |

FOREIGN PATENT DOCUMENTS 2494237  8/1980  France .................... 126/443

OTHER PUBLICATIONS

Fuji Evacuated Glass Tube Collector Elec. Rev. (Japan), vol. 27 #3, 1981.

Primary Examiner—Samuel Scott
Assistant Examiner—Noah Kamen
Attorney, Agent, or Firm—B. R. Turner; J. P. DeLuca

[57] ABSTRACT

There has been provided an evacuated tubular solar collector wherein a relatively long extraordinarily large diameter glass tube having sealed hemispheric-like ends surrounds a corresponding large absorber therewithin. A conduit, in heat exchange relation with the absorber, passes through the envelope by means of a hermetic seal. The conduit provides a fluid flow path for a working fluid. Important parameters include, at least one of a ratio of tube diameter to tube length and absorber area to the length of the conduit.

25 Claims, 9 Drawing Figures

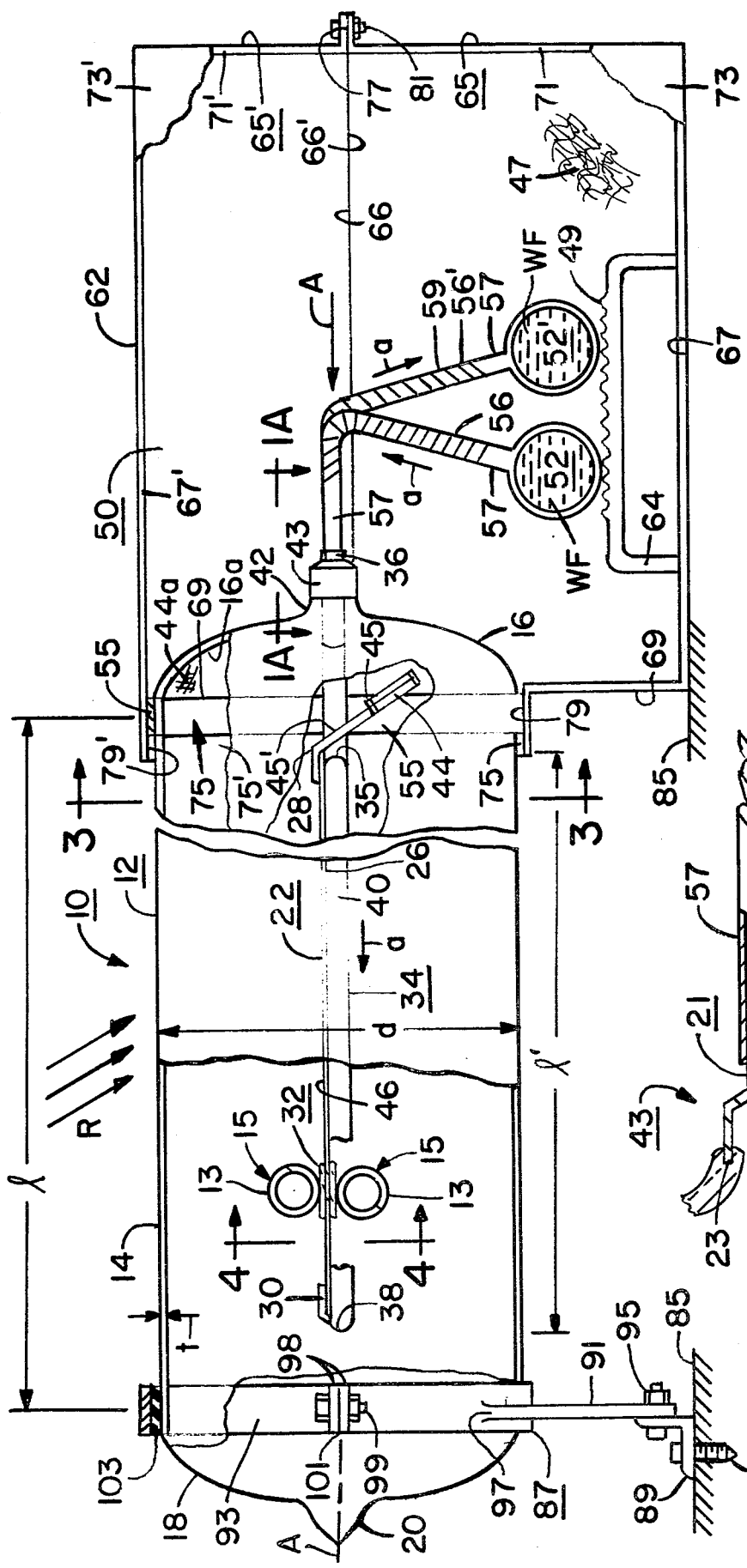

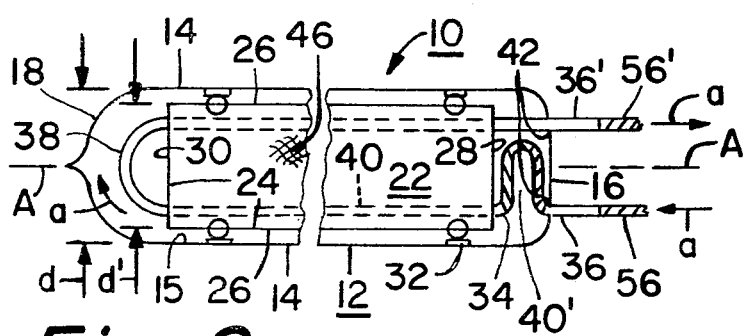
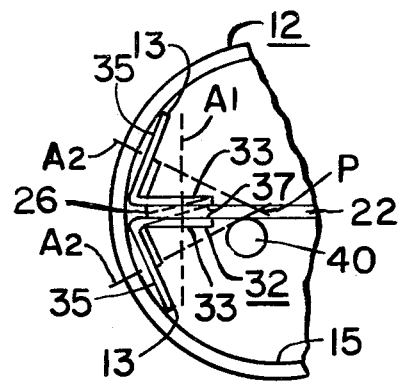
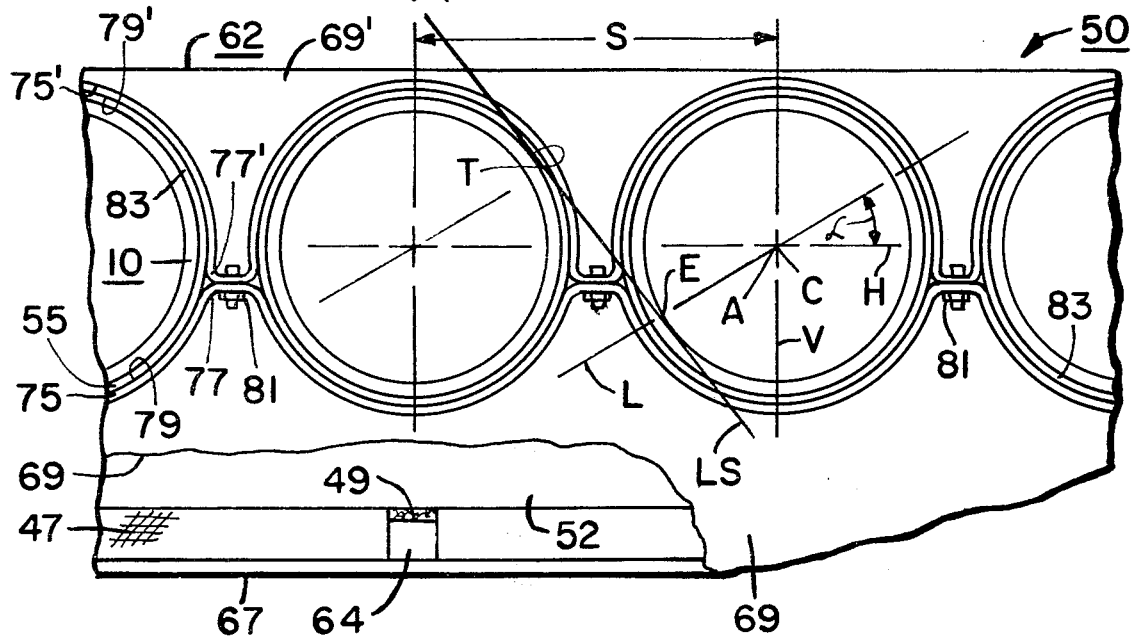
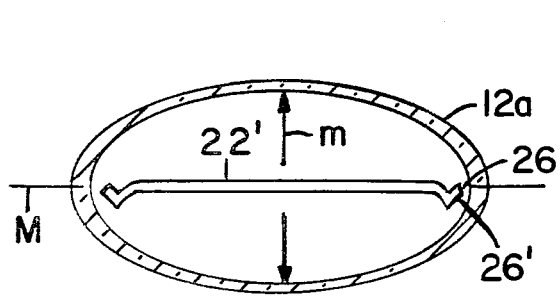
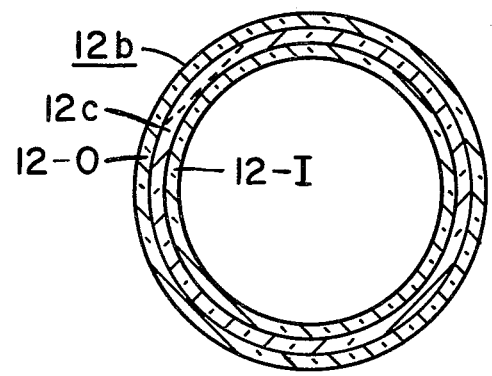

SOLAR COLLECTOR APPARATUS

BACKGROUND OF THE INVENTION

The present invention relates to a solar energy collector system and particularly to an evacuated tubular solar collector or receiver.

In a solar energy collection system, a solar receiver intercepts, absorbs, and converts the solar radiation into sensible heat or useful thermal energy. A thermal load, operatively coupled to and in heat exchange relation with the receiver, utilizes thermal energy to do work. Normally, heat exchange is accomplished by a forced circulation system including a pump for circulating working fluid between the receiver and the load. Typically, a plurality of solar receivers are arranged in an array in order to provide a total receiver area sufficient to do the work required. The receivers are manifolded into the circulation system in a parallel flow arrangement.

A typical evacuated tubular collector utilizes a flat rectangular absorber plate and a U-tube welded or otherwise suitably attached to one side thereof. The absorber and U-tube are located within an evacuated glass envelope. The envelope is transparent to solar radiation. The U-tube is a pipe, bent on itself, passing into and out of the envelope at one end thereof. Glass-to-metal seals hermetically seal the envelope and U-tube. The absorber may be supported within the envelope by support clips securely engaging the absorber and slidably bearing against the glass. Solar radiation, intercepted and absorbed by the absorber, is converted to thermal energy and transferred by conduction to the U-tube and a working fluid passing therethrough.

Although the evacuated tubular collector described above may be manufactured economically with satisfactory thermal efficiency, it has been found that each glass-to-metal seal contributes significantly to production costs and thermal losses (commonly called end losses). Other conductive thermal losses occur as a result of support clip contact with the glass envelope. Manifolding of multiple tubes is complicated by the sheer number of pipe connections required. Insulation is required for portions of the U-tubes exterior of the envelope and the manifold itself.

It has been found that by fabricating an extraordinarily large diameter relatively long envelope, for housing a correspondingly large absorber therewithin, the thermal efficiency of each receiver is increased. Also, the cost of producing one large collector assembly of a given intercept area is less than the cost of assembling a plurality of smaller units having the same aggregate intercept area. In addition, manifolding and installation are simplified, resulting in consequent cost savings due to the fewer number of pipe connections per installation. Other advantages will be described hereinafter in connection with the description of the preferred embodiments of the invention.

SUMMARY OF THE INVENTION

There has been provided an evacuated tubular solar collector wherein a relatively long extraordinarily large diameter glass tube having sealed hemispherical-like ends surrounds a correspondingly large absorber therewithin. A conduit, in heat exchange relation with the absorber, passes through the envelope by means of a hermetic seal. The conduit provides a fluid flow path for a working fluid. Important parameters include, at least one of a ratio of tube diameter to tube length and absorber area to the length of the conduit.

DESCRIPTION OF THE DRAWINGS

FIG. 1 is a schematic fragmented side sectional view of a solar collector and manifold according to a preferred embodiment of the present invention.

FIG. 1A is a schematic fragmented side section of a portion of the solar collector taken along line 1A—1A of FIG. 1.

FIG. 2 is a fragmented top view of the collector of FIG. 1.

FIG. 3 is a schematic side view of the manifold and an end portion of the collector inserted therewithin taken along line 3—3 of FIG. 1.

FIG. 4 is a fragmented schematic end view of the collector of FIG. 1 taken along line 4—4 thereof detailing a support clip structure.

FIG. 5 is a schematic end section of an oval tube and absorber.

FIG. 6 schematically shows a laminated tube in end section.

DESCRIPTION OF THE PREFERRED EMBODIMENTS

Figure 7A:
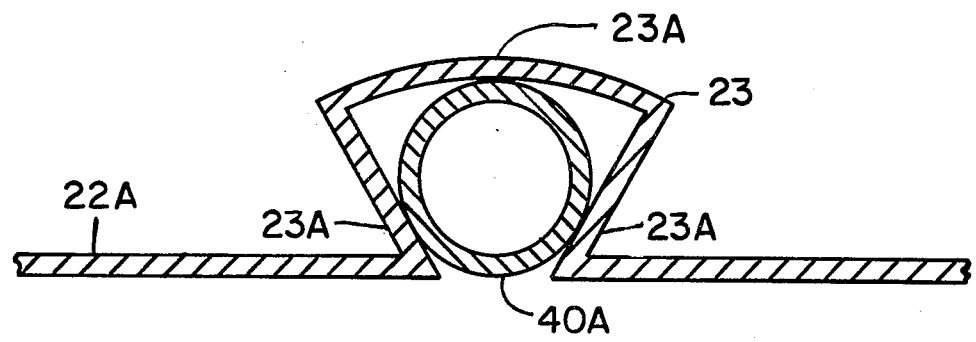
FIGS. 7A and 7B show fragmented cross sectional views of alternate embodiments of an absorber and fluid conduit or pipe.

FIGS. 1 and 2 illustrate a preferred embodiment of the present invention of a solar collector 10 including a transparent glass envelope 12 forming a solar window. The envelope has a cylindrical sidewall 14, and respective inboard and outboard hemispherical-like end portions 16 and 18 butt joined or fused thereto. The true shape of end portions 16 and 18 may be less than half spheres and/or elipsoidal in nature. It is sufficient that end portions 16 and 18 are curved surfaces capable of supporting atmosphere against a near vacuum. A tubulation 20 is formed in outboard end 18 as a conduit for evacuating a space within the envelope 12. After evacuation the tubulation 20 is sealed by a flame working tool or electrical resistance heater as used in cathode ray tube manufacture. Preferably the atmospheric pressure within the envelope 12 should be about $10^{-4}$ torr. or less (i.e., near vacuum). In the present invention, at least one getter 44 may be employed to help develop and maintain a high vacuum as is known in the art. The getter 44 (shown only in FIG. 1) may be mounted in a holder 45 and preferably secured to inboard transverse edge 28 of absorber 22 by holder rod 45'. In the present invention a getter flash 44a, produced after evacuation and during bake out of envelope 14, coats interior walls 16a at inboard end 16 of envelope 12 with a metallic like substance. The flash 44a thereby acts as a suppressor of thermal losses from the inboard end 16 of envelope 12, where most of such thermal losses in the collector 10 occur.

In an alternative embodiment, the getter 44 may be secured to holder 45 near outboard edge 30 of absorber 22. However, if a preferred ON/OFF control mentioned below is used, the getter 44 should be located near the inboard end 28 of absorber 22 since the getter flash may interfere with its operation.

A rectangular shaped absorber 22 is located within the envelope 12 in spaced relation therewith. At least one sun facing side of the absorber 20 has a selective coating 46 deposited thereon. The absorber 22 has a peripheral boundary 24 including, respective lateral edges 26 and respective inboard and outboard transverse edges 28 and 30. Preferably the absorber 22 lies substantially in a diametric plane of the envelope 12. Lateral edges 26 are relatively closely spaced with sidewalls 14. Inboard transverse edge 28 is spaced from inboard end 16, as shown, for convenience of manufacture. Outboard transverse edge 30 is spaced from the outboard end 18 of envelope 12, by a sufficient amount, to allow the absorber 22 to expand as it is heated by absorption of solar energy or insolation. The expansion and contraction phenomenon experienced by the absorber 22 and use thereof as an ON/OFF control for a solar collector is detailed in a copending U.S. patent application Ser. No. 281,023 filed this date and assigned to the assignee herein. To the extent necessary, the teachings of such application are considered to be incorporated herein by reference. The arrangement of diametric alignment of absorber 22 and close spacing thereof with the envelope 12 maximizes the solar intercept area.

Clips 32, detailed in FIGS. 1, 2 and 4 and described hereinafter, support lateral edges 26 of the absorber 22. The clips 32 are secured to the absorber 22 by spring action and slideably bear against an interior surface 15 of sidewall 14 of the envelope 12.

Each clip 32 appears somewhat "T" shaped in side view. A single length of stainless spring steel or bright plated spring wire may be formed into a pair of opposing loops 33 axially aligned with axis A1, and a pair of tangentially adjacent loops 35 aligned along axes A2 which may be parallel to each other and perpendicular to axis A1 prior to installation. The loops 35 form a cross bar of the "T" shaped clip 32. Preferably, loops 35 forming a cross bar of the "T" shaped clip 32 are deformed upon installation into the collector such that axes A2 intersect at a point P near the diametric plane of the absorber. The clip 32 is adapted to grip the absorber 22 near lateral edge 26 thereof by spring action and extend inwardly of the absorber 22 near a corresponding tube section 40. It is noteworthy to mention that after the bake out of the collector 10 the absorber and pipe sections 40 are highly annealed and need good support. Thus, the opposing loops 33 of clips 32 extend across absorber 22 towards the pipe 40 to provide excellent support thereto. A pair of opposed working surfaces 37 of loops 33 engage corresponding opposite sides of the absorber 22. Outboard ends of loops 35 engage the interior walls 15 of the glass envelope 12 at contact points 13, offset from the diametric plane of the envelope 12. The loops 35 forming cross bar of "T" shaped clips 32 form a shallow "V" shape as the loops 35 are urged away from a straight line arrangement upon installation.

The absorber 22 expands and contracts as insolation varies over the solar day. The clips 32 slidably engage the envelope 12 at contact points 13 to accommodate thermal expansion and contraction of the absorber 22. The contact points 13 of clips 32 may be burnished with a low vapor pressure lubricant, such as, molybdenum disulfide. This material has been found to be a good lubricant in vacuous environments, because it will not outgas and destroy the vacuum. The lubricant protects the interior walls 15 of the envelope 12 from scratches.

Clips 32 are preferably manufactured of a shiny, relatively low-conductivity, spring-stainless steel (preferably less than 0.5 watts/Cm °K.). Because they are shiny, clips 35 will exhibit low emmissivity (preferably less than 0.08). Conductive heat loss, from the absorber to the envelope 12 via the clips 32, is reduced due to the relatively low conductivity of the steel forming the clips 32.

Figure 7B:
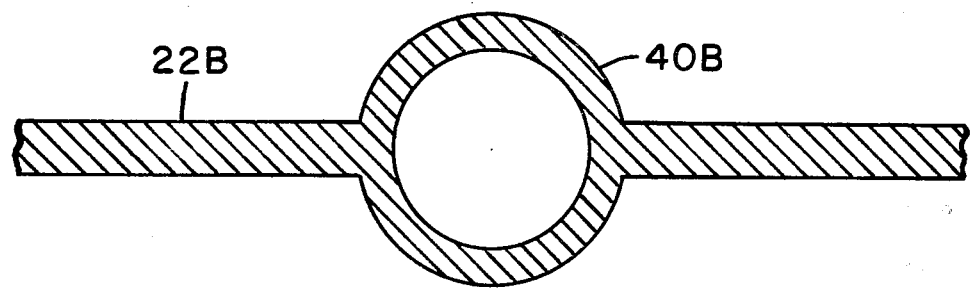

The solar collector 10 includes a conduit or pipe 34 (preferably copper), in the form of a U-tube, for carrying working fluid WF. The conduit extends continuously from respective entrant and exit ends 36-36', exterior of the envelope 12, towards U bend 38, interior of the envelope 12 near the outboard end 18 thereof, via straight tube sections 40, extending both within and without the envelope 12. The tube sections 40 pass through the glass envelope 12 near the inboard end 16 thereof. The entrant and exit ends 36-36' of the conduit 40 are so-called because the direction of working fluid flow determines function. Absorber 22 is joined to a major portion of conduit 34, within the envelope 12, as by a tangential weldment between pipe sections 40 and a rear side 22 of said absorber. Heat energy produced as a result of insolation is conducted from absorber 22 to the conduit 34 and working fluid WF carried therein. In FIG. 7A there is shown another suitable mechanical bonding of absorber 22A to pipe 40A wherein a trough 23 in the absorber 22A having contact points 23A, receives the pipe 40A therein. The contact points 23A touch the pipe 40A for providing heat transfer from the pipe 40A to the absorber 22A. In FIG. 7B absorber 22B and pipe 40B may be extruded in one piece.

The conduit 34 includes an expansion loop 40' shown as located in one of the pipes 40 forming the conduit 34. The loop 40' is formed of a continuous length of a portion of at least one of the pipes 40. Alternative embodiments contemplated herein include straight pipe sections and elbows brazed together, and a length of flexible tubing as hereinafter described, similarly coupled with pipe 40. It should be further understood that an in line bellows (not shown but readily available commercially) could be used as an alternative embodiment to the expansion loop 40. Differentials in inlet and outlet temperatures of the working fluid can cause the pipes 40 to expand at different rates thereby creating a stress on the glass to metal seals 42 described hereinafter. If the pipes 40 expand at different rates the loop 40' compensates for the difference by allowing each pipe 40 to expand and contract independent of the other. Also the loop 40' prevents distortion or twisting of the absorber out of its plane. In a long evacuated tubular collector 10 as described herein the loop 40' is important because the expansion of the absorber 22 and conduit 34 is significant. In a short collector (e.g. 6–8') loop 40' is probably unnecessary.

Glass-to-metal seals 42 hermetically seal the glass envelope 12 with the copper U-tube or conduit 34. So-called housekeeper seals 43, detailed in FIG. 1A, are used to make the glass-to-metal seals 42. A metal sleeve member 21 (preferably copper) is fitted over the conduit 34 and has a large-diameter proximal end 23 concentrically located about conduit 34. The sleeve member 21 has a small-diameter distal end 25 closely fitted with conduit 34. The glass-to-metal seal 42 is made by flame working glass near the inboard end 16 of the envelope 12 onto proximal end 23 and fusing the glass thereto as shown. The sleeve member 21 has a reduced wall thickness near the proximal end 23 in order to allow the metal thereof to stretch, thereby compensating for thermal expansion mismatch of the glass and metal. The distal end 25 of the sleeve member 21 is brazed to the conduit 34.

In an evacuated tubular collector system, conductive thermal losses occur chiefly at glass-to-metal seals such as 42. Convection losses are virtually nonexistant because of the vacuum, and radiation losses are diminished by the selective absorber coating 46. The conduction losses of the glass-to-metal seals 42 may be suppressed by insulating the inboard end 16 of the envelope 12. This is normally accomplished by providing an insulating housing to receive the inboard end 16 of each collector 10. Although insulation of the inboard end 16 greatly reduces the end losses, there is a finite loss for each glass-to-metal seal 42 in a collector 10. In the present invention, the end losses will be about the same as a small collector. However, by providing the extraordinary long and large diameter envelope 12 housing a correspondingly large absorber 22, the total number of glass-to-metal seals 42 for a given absorber area will be reduced. Thus, the total end losses are significantly reduced for a particular installation.

In FIG. 1, the collector 10 is shown mounted within and coupled to a manifold 50. Further details are shown in FIGS. 1A and 3. The manifold 50 includes a housing 62 and a pair of axially disposed fluid pipes 52-52' interior of said housing 62. A flexible coupling pipe 56 connects pipe 52 with entrant end 36 of collector 10. Similarly pipe 52' is coupled to exit end 36' via another flexible pipe 56'. Working fluid WF passes through the conduit 34 of collector 10 from the fluid pipe 52 to the other fluid pipe 52' via the flexible pipes 56-56'. Arrows a show the direction of working fluid flow into and out of the collector 10. The flexible pipes 56-56' (and incidentally the expansion loop 40' referred to above) may be formed sections of copper tubing having cylindrical end portions 57 (one shown in FIG. 1A) and a center section 59 having spirally deformed walls. The cylindrical end portions 57 may be joined to the other tubing as required and the center section 59 can be easily bent without becoming kinked. The center section 59 may be otherwise formed to prevent kinks as may be available in the piping industry.

The housing 62 of the manifold is in the form of a rectangular box. The housing 62 has a bottom portion 65 having an upper margin 66. The bottom portion 65 includes a bottom wall 67 and respective front, back and end walls 69, 71 and 73. Front wall 69 has a semicylindrical opening 75 for receiving the inboard end of the collector 10. A peripheral flange 77 extends outwardly about upper margin 66 of respective front, rear and end walls 69, 71 and 73 and semicylindrical opening 75 in front wall 69. The flange 77 extending outwardly of semicylindrical opening 75 forms a lower support surface 79 for collector 10. The housing 62 also includes a cover portion 65', which will be referenced with primed numerals corresponding to similar elements of the bottom portion 65. Cover portion 65' bounded by a lower margin 66' includes a top 67' and respective front, back and end walls 69', 71' and 73', a semicylindrical opening 75' in front wall 69', peripheral flange 77', upper semicylindrical opening 75' and an upper support surface 79'. The flanges 77 and 77' may be joined together by fasteners 81 as shown. Semicylindrical openings 75 and 75' are opposed forming a circular opening 83 to receive the collector 10.

The pipes 52-52' mentioned above are located axially of the bottom portion 65 of housing 62. A plurality of "C" channel supports 64 carry the pipes 52-52' in spaced relation with bottom wall 67. Insulator 49 spaces the pipes 52-52' from support 64 to reduce conduction of heat energy carried in the working fluid therewithin to without the housing 62. The interior of the housing 62 is filled with a relatively high "R" value insulation 47 to reduce thermal losses.

The inboard end 16 of each collector is located within an associated one of the circular openings 83. A gasket 55 lines the respective upper and lower support surfaces 79-79' of the opening 83 and forms a seal between the glass of the envelope 12 and the support surfaces 79-79'. Fasteners 81, intermediate each circular opening 83, draw flanges 77-77' tightly together to maintain a close fit of the support surfaces 79-79' against the sidewalls 14 of the envelope 12.

In the present invention, the collectors are shown mounted on a flat surface such as a roof 85. The manifold 50, supported by roof 85, carries inboard end 16 of the collector 10 in the opening 83. An end bracket 87 supports an outboard end 18 of each collector 10 such that a collector axis A is slightly inclined, with the outboard end 18 higher than the inboard end 16 by about ¼ to ½". This allows the collectors 10 to drain back towards the manifold 50 if desired. End bracket 87 includes an L-bracket 89, a flexible support bar 91 and a split ring 93. The L bracket 89 may be mounted to the roof 85 by fastener 92. Flexible support bar 91 is joined at one end to the L bracket 89 by a bolt 95. Split ring 93 is joined to the support bar 91 at its free end 97 by a weldment. The split ring 93 has separate flange portions 98 forming seam 101. The flange portions 98 may be separated to allow the split ring 93 to receive the outboard end 18 of the collector therein. Bolt 99 draws flange portions 98 together closing split ring 93, as shown. A soft pad 103 lines the interior of split ring 93 to protect the envelope 12 from scratches.

In the present invention, since it is intended to provide an extraordinary long collector, thermal expansion of the glass envelope 12 is accommodated. Normally, in a short collector, the glass movement is negligible. In a 24' long collector, however, the glass may expand as much as 0.1" or more, thus the split ring 93 and liner 103 may be loosely fitted about the envelope 12 and thereby allow for expansion and contraction of the glass forming the envelope 12. Also, the flexible support bar 91 accommodates thermal expansion of the envelope 12, in the axial direction thereof, should the split ring 93 bind up about the envelope 12. Other arrangements for support of the outboard end 18 of envelope 12 may be used, as for example a V block.

In FIG. 3, two (2) full openings 83 in manifold 50 are shown as well as portions of adjacent openings 83. A central axis A of each collector 10 coincides with a center C of opening 83. In an actual installation, the axes A of collector 10 could be east-west (E-W) or north-south (N-S). In the arrangement of FIG. 3 collector 10 is oriented with axes A E-W (into the page). Each collector 10 is shown rotated about its axis A, such that in each, its absorber 22 lies along a line L oriented at a latitute angle $\alpha$ with the horizontal H. Each collector 10 may be individually rotated to the proper latitude angle $\alpha$ and connections made with the pipes 52-52' in manifold 50. Since the flexible connectors 56-56' may be easily bent, adjustment to the latitude angle $\alpha$ of the absorber may be made after each collector 10 is located in opening 83 and connected to the manifold 50.

In an N-S orientation (not shown) the collectors 10 are arranged with absorbers 22 all lying in a diametric plane (see horizontal line H shown in FIG. 3). The entire group of such collectors 10 may be lifted together with axes A parallel to each other but inclined at a correct latitude angle of inclination for a particular geographic location. For example, in a N-S arrangement the manifold 50 and collectors 10 could be mounted on a tilted roof, in the same manner as shown in FIG. 1, if the roof angle is correct, i.e. the same as the latitute angle. Otherwise an appropriate support structure, not shown, may be used.

In FIG. 3 the spacing between centers C of openings 83 is fixed at some distance S. Since it is preferred that the housing 62 be prefabricated of metal or molded plastic, the distance S between centers C is normally fixed. However, the spacing of collectors 10 is an important parameter. In the arrangement shown in FIG. 3 (assuming an E-W orientation) one absorber 22 lying along line L can shade an adjacent absorber. Further, the glass of the envelope 22 should be out of a line of sight (see line LS) of an adjacent absorber with respect to the sun (not shown). Therefore, in order to prevent shade, the spacing S between the collectors 10 may be approximately set for a desired latitude angle $\alpha$ but in accordance with the following expression:

$$S = W/\cos \alpha' \quad (1)$$

where:
S is the distance between collector axes A (centers C of openings 83),
W is the width of the absorber, and
$\alpha'$ is the modified latitude angle $\alpha$ for the lowest position of the sun in the winter sky, taken along a line of sight LS including a lower edge E of one absorber and a tangent point T of an adjacent envelope.

The value of the actual latitude angle $\alpha$ may be varied in accordance with the limits of current practice. Although the latitude angle $\alpha$ is set by the designer it is a compromise. It is an average taken against respective winter and summer angles $\theta_w$ and $\theta_s$ as measured from an equinox axis Ae. The modified latitude angle $\alpha'$, however, is measured against the winter sun angle $\theta_w$ thus:

$$\alpha' = \alpha + \theta_w \quad (2)$$

where:
$\alpha$ is the latitude angle, and
$\theta_w$ is the winter sun angle off the equinox axis Ae. (Note the line of sight LS corresponds to the winter angle.)

The spacing S of the collectors 10 in the manifold 50 may be established by a series of manifold housing designs each adapted to accommodate ranges of latitudes.

Different roof angles or pitches may also be easily accommodated by the collector 10 of the present invention. For example, if the collector 10 is located in the E-W orientation on a horizontal roof 85 (see FIGS. 1 and 3), the latitude angle of the absorber 22 is set at $\alpha$ as shown. If the collectors 10 lie on a pitched-south-facing-roof the latitude angle is reduced by the pitch of the roof. This arrangement allows the present invention to be unobtrusively and aesthetically located on any E-W falling roof or structure including a vertical wall. In any situation, the spacing S in the collectors 10 should be calculated using the modified latitude angle $\alpha'$ and an appropriate manifold. The collectors 10, however, are set at the actual latitude angle $\alpha$ chosen by the designer.

For a N-S orientation, calculations should be made to determine the sunrise and sunset angles for the solar day. When these values are determined, the spacing of the collectors 10 will be set in accordance with Equation (1) above but substituting the sunrise or sunset angle for $\alpha'$.

In solar collector systems, it is imperative to minimize cost of manufacture and maximize energy efficiency. The solar collector 10 and manifold 50 of the present invention are arranged to take advantage of the economies of scale of large receivers and thereby approach such requirements. For example, consider an array of six (6) receiver tubes each sized to accommodate an absorber 4" wide and 6' long yielding a total absorber intercept area of about twelve (12) square feet. Such a system requires: twelve (12) glass-to-metal seals 42; twelve (12) manifold connections; and about seventy-two (72) feet of conduit 34 (12 feet per tube). For an arbitrarily chosen $\alpha'$ of 41.5° (Cos $\alpha' = 0.75$) from the equation (1), the spacing S=4"/0.75 or about 5.3".

A single tube, sized to accommodate a 6" wide×24' long absorber has the same solar intercept area, i.e. twelve (12) square feet, but requires only two (2) glass-to-metal seals 42, two (2) manifold connections and about forty-eight (48) feet of conduit 34. The collector spacings would be about 8" at $\alpha' = 41.5°$. In addition there are significantly fewer support clips 32 required. A 6' long absorber requires about four (4) clips or a total of twenty-four (24), for the six (6) tube array. In a single tube arrangement about nine (9) clips are required.

In the above example end losses are reduced by a factor of six (6) or more than 80% and the clip losses are reduced by at least 60%. Clearly, labor costs are reduced significantly since there are fewer parts to be assembled per unit area of absorber intercept area produced.

In a preferred embodiment of the present invention the following parameters are assigned approximate and exemplary values thought to provide an unusual efficiency of scale:
Envelope length l: 16' plus ends
Adsorber length l': 16'
Envelope diameter d: 6.5"
Absorber width d': 6.0"
Glass thickness t: 0.130 (minimum) Length of conduit 2(l'): 32' plus entrant and exit ends
No. of clips 32: Nine (9)
No. of glass-to-metal seals 43: Two (2)
Area of absorber 22 (l'd'): 8 feet$^2$
l/d: 32/1
2(l')/l'd: 4/1 (unit length/unit area-e.g., ft./ft.$^2$)
t/d: 1/50

In a solar collector system, the manifold 50 is a source of thermal loss. As a major component of a system it contributes significantly to materials and labor costs. Consequently, the manifold 50 must be adequately insulated to suppress thermal loss; minimally sized to reduce materials requirements; and simple in design to permit rapid assembly and thereby reduce labor costs. Since the most significant source of thermal loss is conduction through the insulation 47 to ambience, downsizing of the manifold 50 can be a most effective solution to the problem of thermal losses. The present invention requires a significantly smaller manifold 50 per unit area of the absorber intercept area than conventional collector systems. In the example above one (1) 6" wide×24' long collector 10 of the present invention would require approximately 8" of manifold 50 whereas the arrangement of an array of six (6) 4" wide×6' long collectors would require about 32" of manifold. From the standpoint of materials and labor, the arrangement of the present invention exhibits superior characteristics. It should be also noted that, since thermal losses also occur by radiation from exterior surface area portions of the manifold 50, the decrease in manifold length greatly reduces the available surface area for radiation.

The diameter d and length l of the envelope 12 may be produced in any practical size, limited only by forming, architectural, and handling constraints. Since a large diameter tube, forming sidewall portions 14 of envelope 12 requires substantially more glass than a small tube, the pull rate is slower. Clearly, there occurs a practical limit where the expense of such glass is not overcome by the solar efficiency of a large collector. In conventional glass tubing manufacture, the weight per unit length of a glass tube increases about fourfold with a doubling of the diameter. This is because the wall thickness t is also doubled at the same time. Thinner tubing may be made in order to reduce materials requirements. However, since glass strength must be preserved, there is a practical limit of tube wall thickness for a given diameter. The limit for conventional soda lime glass is roughly 0.02. Such tubing can be made with a wall thickness t to diameter d ratio as small as 1/50.

For even greater weight savings, an oval tube 12a as shown in FIG. 5, could be made. The tube 12a has respective major and minor axes M-m. If the oval tube 12a is chosen, chemical strengthening or laminate technology would be especially necessary.

If formed of a single layer of strengthened glass the oval tube 12a could have respective major and minor axes M-m in an aspect ratio M/m of about 3 without implosion upon evacuation. Thus the absorber 22' lying along the major axis M could be wide, and yet the tube 12a could be significantly lighter than a circular tube of the same diameter as major axes M. In addition, the absorber 22' may be formed with longitudinal "V" crimps 26' running lengthwise of the lateral edges 26 as shown. The "V" crimps help to stabilize or rigidify the absorber 22' and reduce the number of clips 32 (not shown in FIG. 5) to about a total of nine (9) in an eighteen (18) foot absorber, or about two (2) for each three (3) feet of absorber 22'.

Laminate tubing 12b, as shown in FIG. 6, is formed of at least three layers of glass having different coefficients of linear expansion. Respective inner and outer layers 12-I and 12-O may be a durable low expansion glass and central layer 12-C may be a higher expansion low durability glass. The difference in expansion creates a tension in the central layer 12-C and strengthens the tube 12b. Evacuation adds compression. A laminated tube 12b could be formed as the oval tube 12a of FIG. 6. Lamination would add strength to the outside surface in the vicinity of the major axis M.

We claim:

1. A solar collector comprising: a receiver tube formed of a closed glass envelope being evacuated to a partial pressure of about at least $10^{-4}$ torr., said envelope including a relatively thin wall formed of a relatively long section of large outside diameter cylindrical tubing of at least sixteen feet in length and having a diameter to wall thickness in a ratio of at least 1/50, said envelope further including opposed hemispherical-like inboard and outboard end portions sealed to corresponding end portions of the tubing for closing said envelope, the envelope being substantially transparent and forming a solar window to allow for the passage of solar radiation therethrough; a continuous heat exchange conduit passing through the envelope including a lengthwise straight pipe section having entrant and exit ends, the pipe section bent on itself forming a pair of pipes and U bend therebetween, a major portion of the pipes being located within the envelope in parallel axial relation therewith, the U bend at one free end of the conduit being within said envelope near the outboard end thereof and the entrant and exit ends adjacent each other being at an opposite end of the conduit exterior of the envelope near the inboard end thereof, said envelope being uninterrupted except for the passage of the conduit therethrough, said conduit being hermetically sealed with the envelope to maintain the evacuated condition thereof; an absorber having opposed front and rear sides, a pair of opposed lateral edges and a pair of opposed transverse edges joining said lateral edges, said absorber being located entirely within the envelope and joined at its rear side in heat conducting relation with the major portion of the conduit, said absorber being sized so as to closely fit within the envelope such that the lateral edges of the absorber are in closely spaced relation with opposite portions of interior walls of the envelope in a diametric plane thereof, said absorber defining a solar intercept area; an energy selective coating deposited on the front side of said absorber; and a plurality of support means each including a pair of opposed gripping members springably engaging the front and rear sides of the absorber near the opposed lateral edges thereof, a pair of bearing members one each coupled with a corresponding one of the gripping members, the bearing members for slidably bearing against interior walls of the envelope at contact points offset from the diametric plane thereof, and a lubricating compound deposited on the bearing surfaces where they make contact with the envelope, said compound having a vapor pressure below that of the partial pressure within the envelope for preventing degradation of the evacuated condition thereof.

2. A solar collector as defined in claim 1 wherein the cylindrical tubing has a length to diameter ratio of at least 32.

3. A solar collector as defined in claim 1 wherein the length of the major portion of pipes within the envelope to the area of the absorber are in a ratio of about four unit lengths to one unit area as measured in feet.

4. A solar collector as defined in claim 1 wherein said support means comprises, a helically wound T shaped clip formed of a continuous length of spring wire formed of a relatively low thermal conductivity and low emissivity metal.

5. A solar collector as set forth in claim 4 wherein the T shaped clip includes a cross bar and intermediate depending leg respectively including: a pair of parallel axial aligned adjacent turns forming the gripping member and; a pair of opposed axial colinear turns connecting one of the adjacent turns to the other, forming the bearing means.

6. A solar collector as defined in claim 4 wherein the gripping member extends from near the pipe outwardly of the absorber to beyond the lateral edge thereof.

7. A solar collector as defined in claim 4 wherein the spring wire has a relatively low thermal conductivity of not more than about 0.5 watts/Cm °K. and a relatively low emissivity in the infrared range of radiation of not more than 0.08.

8. A solar collector as defined in claim 1 where the conduit includes expansion means located within said envelope for allowing one of the pipes to move relative to the other.

9. A solar collector as defined in claim 8 wherein the expansion means includes a loop inline with at least one of the pipes, said loop being formed of a bent portion of said conduit.

10. A solar collector as defined in claim 8 wherein said expansion means comprises at least one of a bellows inline with said conduit and a pipe section having helically deformed wall portions.

11. A solar collector as defined in claim 1 wherein the absorber includes a pair of V crimps one each formed near lateral margins of the absorber and running longitudinally thereof.

12. A solar collector as defined in claim 1 wherein the pipes and absorber are extruded in an integral body.

13. A solar collector as defined in claim 1 wherein the absorber has a trough therein for receiving one each of the pipes, said troughs having wall portions for contacting the corresponding pipe in heat exchange relation.

14. A solar collector as defined in claim 1 wherein the pipes and the absorber are coupled along a tangential weldment therebetween.

15. A solar collector as defined in claim 1 wherein said tubing has an eliptical profile with a longitudinal axis and mutually perpendicular major and minor axes transversely thereof, the major and minor axes in an aspect ratio of about three to one; and said wall thickness to diameter ratio being calculated relative to the major axis.

16. A solar collector as defined in claim 1 wherein said glass envelope is formed of an ion exchange chemically strengthened glass.

17. A solar collector as defined in claim 1 wherein said glass envelope is formed of at least two opposed layers of vitreous materials and a central layer formed therebetween, each opposed layer having a coefficient of expansion less than the central one for creating successively compressed tensioned and compressed layers of laminated glass.

18. A solar collector as defined in claim 1 further including: a plurality of said receiver tubes; and a manifold for joining a plurality of said receiver tubes into a parallel axial array including: a housing having side and end walls and a plurality of openings in at least one side wall thereof, said openings sized for receiving the inboard end of the envelope and the conduit means, inlet and outlet conduits axially located within the housing for connection with the conduit means, the openings being spaced in order to prevent shading of adjacent absorber as an approximate function of $W/\cos \alpha'$, wherein W is the width of the absorber and $\alpha'$ is a selected angle of incidence of solar radiation on said absorber along a line formed of at least two points including a tangent of said radiation to an adjacent envelope and a point in the lateral edge of the absorber close to an adjacent envelope; insulation means located within the housing for thermally insulating the inlet and outlet conduits and conduit means from ambience, an outboard support means for carrying an outboard end of the envelope remote from the manifold, and said support including means for allowing axial motion of the envelope relative to the manifold.

19. A solar collector apparatus as defined in claim 18 wherein the manifold includes support means bordering the openings for carrying the inboard end of the envelope.

20. A solar collector apparatus as defined in claim 19 wherein the support means comprises a cylindrical protrusion extending axially of the envelope for engaging sidewall portion of said envelope.

21. A solar collector apparatus as defined in claim 19 further including gasket means for sealably engaging the support means with the envelope.

22. A solar collector apparatus as defined in claim 21 further including insulative supporting members located in the manifold for carrying the inlet and outlet conduits in spaced relation with the housing.

23. A solar collector apparatus as defined in claim 18 including a mass of insulation surrounding the inlet and outlet conduits within the housing.

24. A solar collector apparatus as defined in claim 18 wherein the outboard support member comprises a cylindrical support ring axially slidable over the outboard end of the envelope, and means attached to the support ring for securing the support ring to a stable reference surface.

25. A solar collector apparatus as defined in claim 24 wherein the means for securing the support ring to the reference surface comprises a flexible bar adapted to be mounted for flexible motion axially of the envelope.

* * * * *